US009357243B2

(12) United States Patent
Green et al.

(10) Patent No.: US 9,357,243 B2
(45) Date of Patent: May 31, 2016

(54) MOVIE COMPILATION SYSTEM WITH INTEGRATED ADVERTISING

(71) Applicant: Splenvid, Inc., San Francisco, CA (US)

(72) Inventors: Henry J. Green, Saratoga, CA (US); Jeffrey H. Raubitschek, San Francisco, CA (US)

(73) Assignee: Splenvid, Inc., San Francisco, CA (US)

( * ) Notice: Subject to any disclaimer, the term of this patent is extended or adjusted under 35 U.S.C. 154(b) by 0 days.

(21) Appl. No.: 14/187,172

(22) Filed: Feb. 21, 2014

(65) Prior Publication Data

US 2014/0245348 A1 Aug. 28, 2014

Related U.S. Application Data

(60) Provisional application No. 61/769,336, filed on Feb. 26, 2013, provisional application No. 61/769,341, filed on Feb. 26, 2013.

(51) Int. Cl.
*H04N 7/025* (2006.01)
*H04N 21/235* (2011.01)
*H04N 21/81* (2011.01)
*H04N 21/2368* (2011.01)
*G06Q 30/02* (2012.01)
*H04N 21/85* (2011.01)

(52) U.S. Cl.
CPC ......... *H04N 21/235* (2013.01); *G06Q 30/0241* (2013.01); *H04N 21/2368* (2013.01); *H04N 21/812* (2013.01); *H04N 21/85* (2013.01)

(58) Field of Classification Search
CPC combination set(s) only.
See application file for complete search history.

(56) References Cited

U.S. PATENT DOCUMENTS

| | | |
|---|---|---|
| 8,543,917 B2 | 9/2013 | Ketola et al. |
| 2003/0028873 A1* | 2/2003 | Lemmons ...................... 725/36 |
| 2007/0189708 A1 | 8/2007 | Lerman et al. |
| 2007/0240072 A1* | 10/2007 | Cunningham et al. ........ 715/764 |
| 2008/0010601 A1 | 1/2008 | Dachs |
| 2008/0104503 A1* | 5/2008 | Beall et al. .................... 715/233 |
| 2008/0154931 A1 | 6/2008 | Jacobs et al. |
| 2009/0280897 A1 | 11/2009 | Fitzmaurice et al. |
| 2010/0289900 A1 | 11/2010 | Ortiz |
| 2011/0107368 A1* | 5/2011 | Rouse et al. ..................... 725/34 |
| 2011/0161348 A1* | 6/2011 | Oron ............................. 707/769 |
| 2012/0144343 A1* | 6/2012 | Tseng ............................ 715/834 |
| 2012/0162436 A1 | 6/2012 | Cordell et al. |
| 2012/0265758 A1 | 10/2012 | Han et al. |
| 2012/0290336 A1 | 11/2012 | Rosenblatt et al. |
| 2013/0054634 A1 | 2/2013 | Chakraborty et al. |
| 2013/0124189 A1 | 5/2013 | Baldwin |
| 2013/0124242 A1 | 5/2013 | Burke et al. |
| 2013/0195429 A1 | 8/2013 | Fay et al. |
| 2013/0290818 A1 | 10/2013 | Arrasvuori |
| 2014/0025799 A1 | 1/2014 | Azizi et al. |

* cited by examiner

*Primary Examiner* — Chenea Smith
(74) *Attorney, Agent, or Firm* — Stephen M. De Klerk

(57) ABSTRACT

An automated movie compilation system is described. An application on a mobile device has a capture component that samples media assets and a data asset synchronizer that synchronizes the media assets over a network with a backend server. The backend server has an asset data synchronizer that stores the media assets in a data store, a movie compiler combining the media assets and further assets into a movie compilation, and a movie server serving the movie compilation for viewing. The mobile application has a compiled movie receiver that receives a movie compilation from the backend server and a movie playback system that plays the compiled movie on the mobile device. Advertisers can upload establishing shot clips for viewing in the movie compilation.

15 Claims, 9 Drawing Sheets

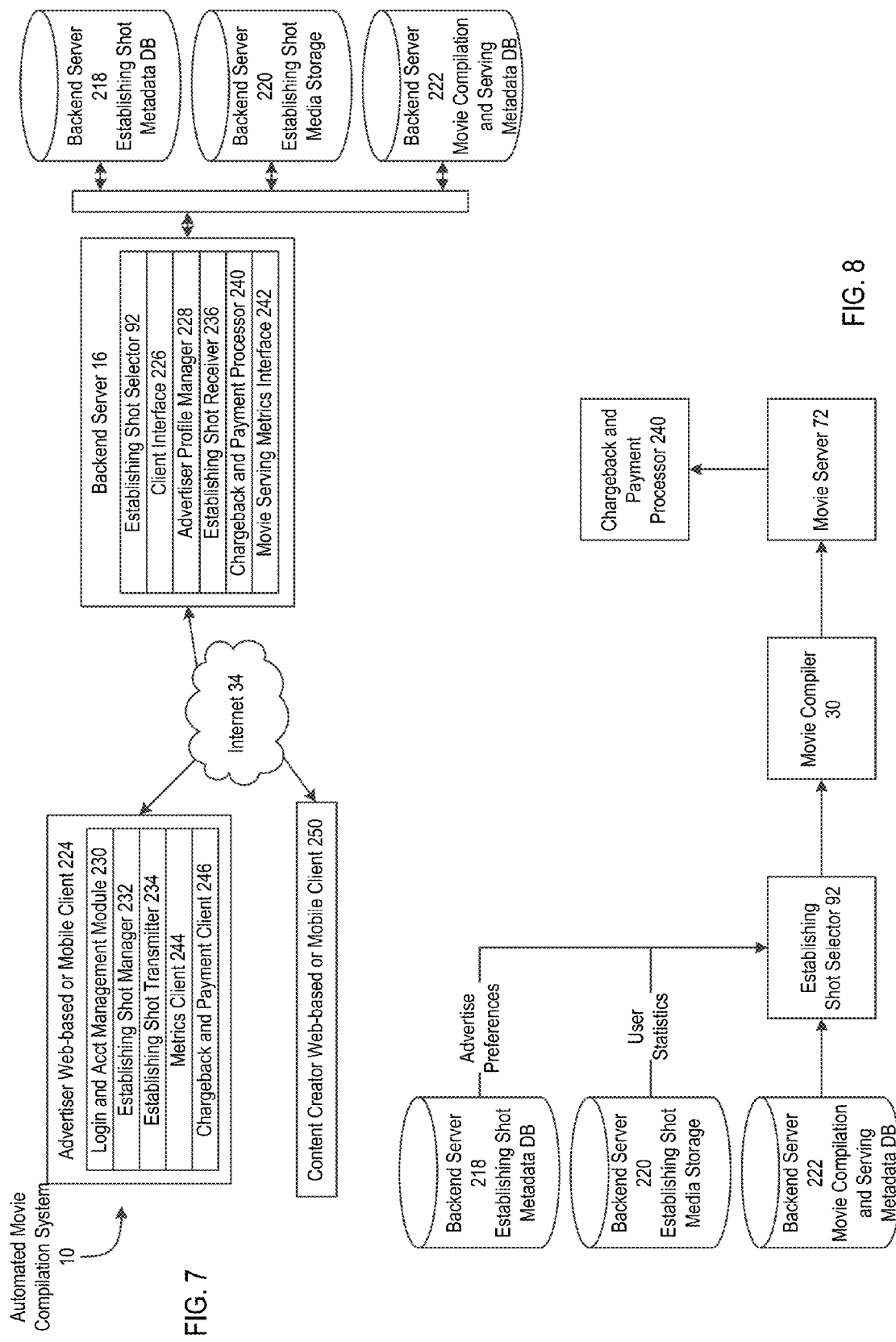

US 9,357,243 B2

MOVIE COMPILATION SYSTEM WITH INTEGRATED ADVERTISING

CROSS-REFERENCE TO RELATED APPLICATIONS

This application claims priority from U.S. Provisional Patent Application No. 61/769,336, filed on Feb. 26, 2013 and U.S. Provisional Patent Application No. 61/769,341, filed on Feb. 26, 2013, which are incorporated herein by reference in their entirety.

BACKGROUND OF THE INVENTION

1). Field of the Invention

This invention relates to a method of automatically compiling a movie, an automated movie compilation system and a mobile device having a mobile application for the same.

2). Discussion of Related Art

Mobile devices such as mobile phones have become ubiquitous for taking pictures, videos and the like that are then stored within a photo or video library on a computer readable medium within the mobile device. In some cases the user can edit the pictures and videos on their mobile device. Alternatively, the user can download media including pictures and videos to a personal computer and use software on the personal computer to edit the pictures and videos. Such software usually permits the user to manually stitch clips together to create a movie compilation.

Movie compilations are not created automatically. In particular, media assets and further assets are usually not combined in any automated manner. Because of the manual nature that movies are compiled, it is not easy for a user to create a temporal or montage movie compilation using or based on media, non-media assets and metadata.

A movie created by a user on their mobile device may have media that may be relevant for advertisers. For example, an owner of an amusement park may be interested in a movie that has been taken by a user on their mobile phone showing activities at the amusement park. The owner of the amusement park may be interested in providing an advertisement that will be displayed in association with the movie taken by the user of the amusement park.

SUMMARY OF THE INVENTION

The invention provides a method of automatically compiling a movie including storing, with a processor, media assets, storing, with the processor, metadata for each one of the media assets, establishing, with the processor, a plurality of advertiser accounts, storing, with the processor, an establishing shot in association with each advertiser account, storing, with the processor, metadata for each establishing shot, selecting, with the processor, one of the establishing shots that are associated with the advertiser accounts based on a match between the metadata of the media asset and the metadata of the establishing shot and serving, with the processor, a movie compilation for viewing, wherein the movie compilation includes the establishing shot combined with the media asset.

The invention also provides an automated movie compilation system including a processor, a computer readable medium connected to the processor, a data store connected to the processor and a set of instructions on the computer readable medium that are executable by the processor. The set of instructions include an asset and metadata synchronizer storing media assets and metadata for each one of the media assets, an advertiser profile manager establishing a plurality of advertiser accounts, an establishing shot receiver storing an establishing shot in association with each advertiser account, a movie serving metrics interface storing metadata for each establishing shot, an establishing shot selector selecting one of the establishing shots that are associated with the advertiser accounts based on a match between the metadata of the media asset and the metadata of the establishing shot and a movie server serving a movie compilation for viewing, wherein the movie compilation includes the establishing shot combined with the media asset.

BRIEF DESCRIPTION OF THE DRAWINGS

The invention is further described by way of example with reference to the accompanying drawings, wherein:

FIG. 7 is a block diagram of components of the automated movie compilation system that are specific to establishing shots that are created by advertisers;

FIG. 8 is a block diagram illustrating connection between components and modules shown in FIG. 7;

DETAILED DESCRIPTION OF THE INVENTION

Figure 1:
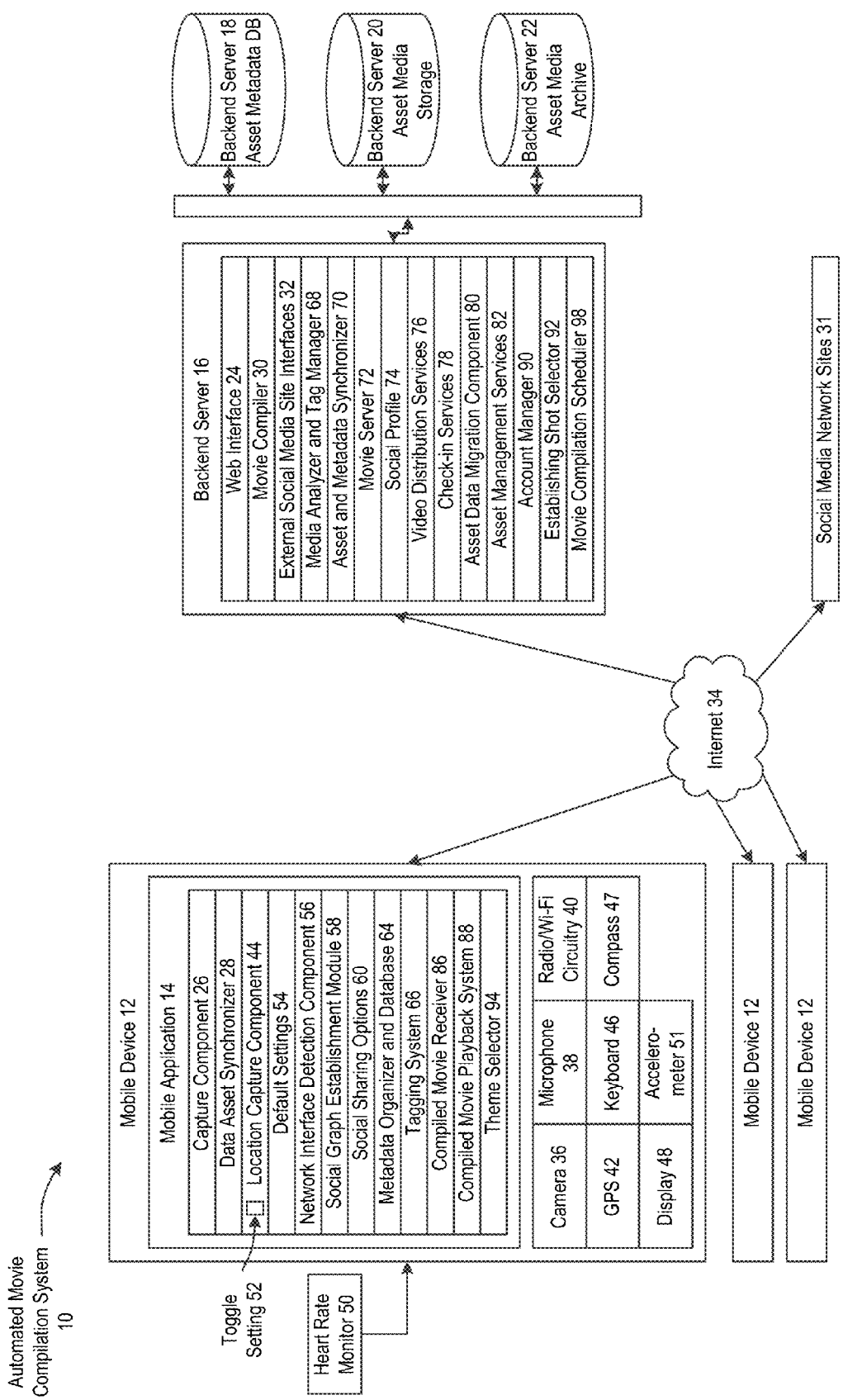
FIG. 1 is a block diagram of an automated movie compilation system according to an embodiment of the invention.

FIG. 1 of the accompanying drawings illustrates an automated movie compilation system 10 that includes of a plurality of mobile devices 12, such as mobile phones, cameras, computers that each run a special mobile application 14, a plurality of backend (cloud-based) servers 16, 18, 20 and 22 and a web interface 24.

The mobile application 14 has a capture component 26 that captures assets (data and metadata). An asset data synchronizer 28 uploads the assets to the backend server 16. The backend server 16 uses a number of algorithms to combine the assets into a movie compilation using a movie compiler 30. The movie compilation can then be viewed by the asset creator on either their mobile device 12 or on a personal computer via the web interface 24. The asset creator can share the movie compilation with a select group (friends or relatives) via the system 10 or via a number of social media network sites 31 that are enabled through external social media site interfaces 32. The asset creator can also publish the movie compilation to the general public. Because the system 10 can, but does not require active user interaction to create the movie compilation the system essentially provides for "zero button movie creation" or "fully automated movie creation".

The asset data synchronizer 28 uploads the assets to the backend server 16 through a network, typically the Internet 34. The capture component 26 captures asset data and metadata. Assets include media assets, device and personal telemetry data, and other contextual information that can be sampled by the mobile device 12. Examples of media assets are pictures and videos that are captured with a camera 36, and audio recordings that are captured with a microphone 38.

Examples of personal telemetry items are geographic location ("geo-location") that can be captured with a radio and Wi-Fi circuitry 40 in conjunction with a global positioning system (GPS) module 42 and a location capture component 44 of the mobile device 12, a compass 47 can add directional information to media assets, mood/feeling designations that can be entered by the creator using a keyboard 46 and display 48, heart rate monitoring data retrieved with a heart rate monitor 50 (or another personal telemetry apparatus) that is wirelessly connected to the mobile device and an accelerometer can add acceleration data to media data. Examples of other contextual information are calendar events, instant messages, and music tracks that are located in memory in the mobile device 12. Metadata is also gathered for each asset, including time, orientation, location and acceleration. The user can either capture media assets directly with the capture component 26 of the mobile application 14, or use the built-in capture capabilities of the mobile device 12. If the mobile application 14 has access to the natively captured assets of the mobile device 12, it can use the natively captured assets together with the assets captured by the mobile application 14. In situations when the user does not want any background tracking creating assets (such as background geo-location tracking), they can use a toggle setting 52 to turn off background asset creation, while still allowing them to actively capture media assets such as pictures and videos using the capture component 26. The user can also optionally have the application copy pictures and videos captured with the application to the mobile device's built-in photo/video album.

The mobile application 14 has default settings 54 for what kinds of assets are incorporated into a movie compilation. For example, assets captured within the mobile application 14 with the capture component 26 can be set by default to automatically be used and therefore automatically be uploaded to the backend server 16. Other asset types, such as those captured by a camera application other than the mobile application 14, may have a default of not being used. The mobile application 14 allows the user to change the usage state of the asset. When assets are marked as being used, they are required to upload to the backend server 16. When assets are marked as being unused, they may or may not be uploaded to the backend server 16, but they will not be used in a movie compilation. The mobile application 14 provides feedback to the user to indicate whether an asset has been uploaded. Upload activity can be deferred until a network interface and detection component 56 detects that higher speed or lower cost networking option is available to the mobile device 12 through the radio and Wi-Fi circuitry, such as a Wi-Fi network (instead of the cellular radio).

Assets from other users (third party assets) can be integrated into a user's movie compilations. The availability of assets can be based on a social and/or spatial and/or temporal relationships. Each one of the external social media site interfaces 32 includes a social graph where the user of the mobile device 12 can establish social friend relationships with other users, including friend of friend relationships. Social relationships can be added from within the mobile application 14 using a social graph establishment module 58 or through the web interface 24. Alternatively, a social graph can be created within the mobile application 14 and can be used for determining social relationship without querying a social media network site 31.

By setting social sharing options 60, the user can share assets with others within their social graph at all times or with restrictions such as only when the mobile device 12 is in the same approximate location at the same time as the mobile device of another user. When a user sets their assets as sharable, they can set the sharing policies across social, spatial, and temporal designations. For example, friends attending a party can elect to share their assets with their friends and set the spatial and temporal settings so that only their friends at the party will have access to their assets. Furthermore, the party host could elect to share publicly captured assets with all attendees by only restricting spatial and temporal settings.

A metadata organizer and database 64 of the mobile application 14 queries the backend server 16 to determine if third party assets are available and if so, download their metadata to show the user. The default use state of a third party asset is likely to be disabled, but the user can enable that asset for use within their movie compilations. If the third party later decides not to share a particular asset, they can remove that asset via their mobile application or web based interface and it will subsequently be pulled out of any movie compilation that it was used for (including other users' movies).

The metadata organizer and database 64 allows the user to enter additional metadata through the microphone 38, keyboard 46 or display 48 to add to an asset through a tagging system 66 incorporated into both the mobile application 14 and the web interface 24. The user can attach tags that represent a subject's name, a setting, or anything else. These tags are uploaded to the backend server 16 and can later be used in combination with tags that are automatically added by a media analyzer and tag manager 68 of the backend server 16 to create montage movie compilations. There are special tags that the user adds through the tagging system 66 of the mobile application 14. For example, during the recording of a video that the user knows is a great shot, they can click on an onscreen button to mark the clip. This automatically adds a tag to that asset indicating its status as a user favorite.

The backend server 16 provides interfaces to the mobile application 14, including an asset and metadata synchronizer 70 for uploading/download assets and metadata to and from the mobile device 12 and to and from the server 18, a movie server 72 for serving movie compilations created with the movie compiler 30, a social profile 74 for maintaining friend relationships and profiles, the external social media site interfaces 32 that provides interfaces to various social media network sites 31, and a video distribution service 76. The backend server 16 provides a check-in service 78 that maps geo-location and address data to businesses and destinations. The backend server 16 hosts the web interface 24 that users and viewers can use for various purposes as described herein.

For asset storage and management, the backend servers 20 and 22 maintain both a database for storing asset and user information, along with a data repository for storage asset media. The data repository may be split between a number of storage tiers (e.g., the server 20) and archive tiers (e.g., the server 22). Storage tiers may include live tiers where asset media can be uploaded and downloaded directly from live tiers. Assets can be moved in and out of archive to live tiers. An migration component 80 synchronizes asset data between the servers 16, 20 and 22.

An asset management service 82 provides management and search capabilities of asset tags, along with automatic tagging of assets. The asset management service 82 automatically tags individuals in pictures and videos using face recognition algorithms. Users may first train the algorithm by identifying people in pictures and/or videos. Alternatively, the backend server 16 may train the algorithm by for example obtaining names of people associated with pictures on a social networking site of the user. The mobile application 14 will log in through a social network application on the mobile device 12. Authentication details will be stored on the backend server 16 for the account on the social media network site 31. The backend server 16 can log into the account to obtain any data needed and display the data to the user on the mobile application 14.

For movie creation/compilation, the backend server 16 uses a number of physical or virtual servers to render movies as well as original clips and effects. Server-created clips and effects are generated based on non-media assets and metadata within the server 18. For instance, location transitions represented by geo-location tracking assets can yield a map-based flyover clip which can then be integrated into the movie compilation. Other assets such as comments can generate a "thought bubble" popup animation, superimposed on either a still image or another video clip. Furthermore, the server can use metadata such as the time of day or derive weather conditions in a particular location at a particular time to generate or select a clip from a library. Generated effects can be added between clips or to clips themselves as a video filter.

The video distribution service 76 publishes a compiled movie on a content distribution network, possibly a third party one. A movie compilation scheduler 98 sends a push notification to the mobile application 14 when the movie compiler has completed a movie compilation. The movie server 72 serves the completed movie compilation for reception by a compiled movie receiver 86 and preview by a compiled movie playback system 88 of the mobile application 14 or by using the web interface 24.

After previewing a movie compilation, the user can choose to share the movie with others via a number of sharing mechanisms. Alternatively, the user can choose to share movie compilations without previewing first. The user may for example send an email containing a link to view the movie, send an alert to other users within this same system that are following the user, or send an alert through social media network sites 31. The external social media site interfaces 32 communicate directly with social media network sites 31 provided authentication credentials are configured by the user. The authentication settings are configured by the user using the social graph establishment module 58 and are stored by an account manager 90 of the backend server 16. The account manager also stores further information that are unique for users, such as user names, passwords and other login information that are created during account setup. Any assets downloaded from the mobile device 12 are stored in association with their respective account.

The check-in service 78 of the backed server 16 interfaces with the location capture component 44 of the mobile application 14. The location capture component 44 determines the GPS location of the mobile device 12 and may be able to determine the address of the location. The location capture component 44 sends the location and address to the backend server 16, and the check-in service 78 does a reverse lookup to determine the name of a business or destination at the location. The check-in service 78 sends the result back to the mobile application 14, where the user can either select the default response or type in an alternate name for storage by the metadata organizer and database 64. The alternate name can help improve the quality of the reverse lookup database that is used by the check-in service 78 on the server 16.

The web interface 24 is provided as complementary to the mobile application 14. Through the web interface 24, users can view and manage their movie compilations and tags, view and comment on other users' movies, follow/watch other users, and manage their profile and friend relationships.

The movie compiler 30 can create temporal compilations and montage compilations. Temporal compilations are structured around the chronology of captured assets from users and their friends. Depending on the quantity of assets, a movie compilation can be rendered or re-rendered soon as soon as new content is received. Temporal compilations tend to be more rigid in their structure, as they represent a story told in sequence. Montage compilations, on the other hand, are more freeform and select choice assets based on their tags across days, weeks, months, and years. The selection of assets varies based on the type of montage being created. New montage types can be added to the system over time and offered to users as additional compilations in addition to their temporal compilations.

Figure 2:
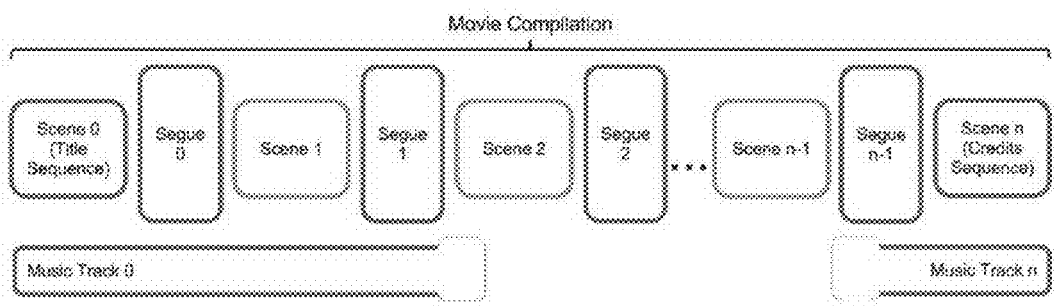
FIG. 2 is a time chart of a movie compilation that is generated by a backend server of the automated movie compilation system and can be viewed on a mobile application of a mobile device of the automated movie compilation system or via a web interface of the backend server.

As shown in FIG. 2, a movie compilation is assembled from a series of scenes (Scene 0, 1 . . . n). In between scenes are segues (Segue 0, 1 . . . n–1), which are generated by a compilation algorithm of the movie compiler 30 in FIG. 1. The initial and final scenes are special in that they are the title sequence (Scene 0) and the credits sequence (Scene n). The title sequence is created based on the user's name, optional movie compilation title, date of the assets, and frequency of movie compilation.

Figure 3:
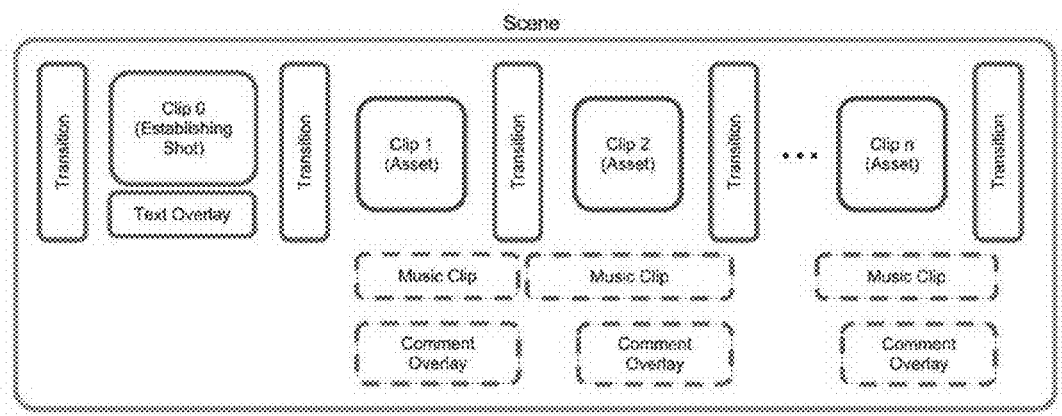
FIG. 3 is a time chart of one scene in the movie compilation.

As further shown in FIG. 3, a scene is composed of clips (Clip 0, 1 . . . n), and may include both media assets that are captured by the user and friends of the user and generated clips based on non-photo and non-video assets and metadata. Between clips are transitions (Transition) such as cut-away, wipe, fade, etc. The initial clip (Clip 0) for each scene is special, as this represents the establishing shot for the scene. The establishing shot is selected by an establishing shot selector 92 in FIG. 1. The compilation service will group assets together into scenes if they follow each other in time and location. Once a significant break in time or location occurs, a new scene is created. The establishing shot clip at the beginning of each scene provides context and setting to the subsequent clips of that scene. As noted above, the asset clips within scenes can be sourced from multiple users.

A number of music/sound tracks (Music Track 0 . . . n) can be added to the movie compilation. The music tracks can either span the entire movie and, if the movie is longer than one track, have multiple tracks in series or have a different music track per scene. In the case of a per-scene music track, a sub-full length sample of the music can be selected by the algorithm. The segues between scenes can also have a short music track or an audio transition between different scene tracks. These options are controlled by movie compilation themes. The credits scene at the end of the movie compilation is optional, but can include credits, copyright and purchase details for each music track.

Figure 4:
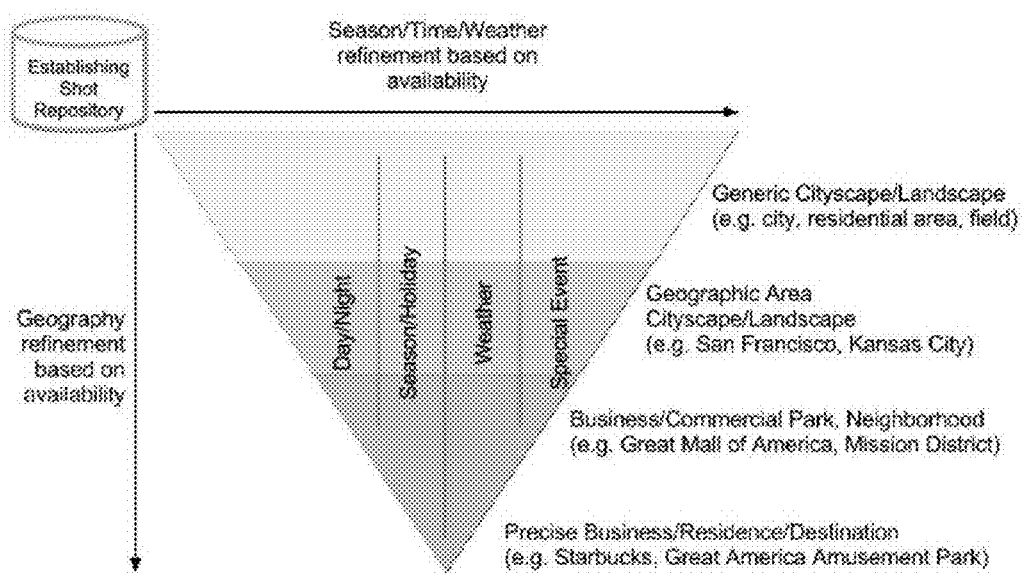
FIG. 4 is a schematic view of an algorithm that is used for selecting an establishing shot.

As shown in FIG. 4, selection of an establishing shot for a scene is performed by an algorithm as a refinement of locale and setting. The system may contain multiple potential establishing shots for the same location, from very generic landscape/cityscape clips to specific advertiser's establishing shot clips of business and destination locations. Furthermore, several clips may exist at each level of detail that account for time of day, season, and weather. The algorithm selects the clip at the highest level of specificity where possible. If a specific clip at a particular time of day of a particular season and particular weather (all as given by the user's asset metadata in combination with date/weather lookups) is not available, the algorithm will fall back to a more generic clip. In its most basic form, the algorithm will:

1. Using the current scene geo-location, check the database for an establishing shot at that location. If the shot does not exist, it will map the location to a generic setting (city, suburb, park) and use a generic stock establishing shot.

2. If a current geo-location specific establishing shot is available, check the database for variations of that location given the time (day/night) of the scene. If these are available, proceed to the next step. Otherwise, use the shots found in this step.

3. Check the database for variations given the season of the scene. If these are available per day/night, proceed to the next step. Otherwise, use the shots found in this step.

4. Check the database for variations given the weather at the location of the scene. If these are available, proceed to the next step. Otherwise, use the shots found in this step.

5. Check the database for variations given a special event based on the date of the scene.

The system can provide for overrides of the basic algorithm to use a specific set of establishing shots, for example during certain occasions. This allows for the display of special shots without requiring every establishing shot permutation to be in the database. The establishing shot may also, depending on the theme, include a filter effect and text overlay.

Movie compilations can evolve as viewers add comments, such as text or video testimonials, at particular moments within the movie. Time-stamped commenting can be done through both the mobile application 14 as well as the web interface 24. When a comment is added during a viewing, it is time stamped and can be subsequently added as a text overlay into the view at that timestamp, along with an avatar image of the commenter. Alternatively, comments can be left with no timestamp, and will be displayed in a conventional text commenting display along with the movie.

Themes provide the ability for the algorithm to create a large variation of movie compilation permutations from the same source assets. Most elements within the algorithm are directed by the theme. The title and credit scenes, segues, handling of music/sound tracks are all themed at the movie level. Within a scene, the transitions, look and format of establishing shots and text overlays are directed by the theme. Additional themes can be added over time.

Themes can be selected with a theme selector 94 within the mobile application 14 or with the web interface 24 in FIG. 1. The user can select a default theme for all of their compilations, and change individual themes as they see fit. Themes can also add a particular render effect on specific clips, as defined by the theme, or across the entire movie compilation. Alternatively, the backend server 16 may automatically select themes based on time of day (e.g., day or night), holidays (e.g., Christmas season), or the type of capture device that was used (e.g., action camera as opposed to a mobile phone camera).

The movie compilation scheduler 98 in the backend server 16 schedules the creation of temporal and montage movie compilations. Temporal movie compilations are created at least once a day, unless there are not enough assets to produce a movie of minimum length, e.g. 30 seconds. If the minimum length for a day has not been reached then several days' worth of assets can be combined together into a single movie compilation, with establishing segues and establishing shots helping to denote day transitions. The algorithm will create the initial daily movie compilation during or at the end of a day (e.g., 3 AM to account for late night activities), although scenes within the compilation may be rendered throughout the day in order to spread rendering workloads. If source assets are modified, such as when assets are removed by the users/friends or added as additional friend/public assets are uploaded, the movie compilation will be re-rendered, or only the parts of the movie that changed will be re-rendered. Subsequent re-renderings can occur if comments are added as previously described. The user can also change themes for the movie, which will typically require a re-compilation.

To summarize the high level algorithm for temporal movie compilation:

1) Create a title sequence scene.

2) For each collection of assets (grouped by predicate for example, those within short time and location distances), concatenate them into a scene a) create an establishing shot based on theme and from a repository b) create clips for assets that aren't videos, guided by the movie theme. Apply theme filters to clips if applicable c) join clips with transitions in between, guided by the movie theme d) apply music track to scene if applicable, attenuating music when there is audio in the clip.

3) Generate segues for between scenes, based on the movie theme.

4) Join together collection of scenes with segues in between.

5) Apply music track(s) to entire movie if per-scene tracks are not used.

Unlike temporal movies, montage movie compilations are less structured and vary by type. Some montage movie compilations are automatically generated by the system, such as when a destination trip is detected by a sequence of location changes over several days. In other cases, the user can elect to have montage movie compilations created based on an event, a person or a place. The event will likely be a repeating event such as a wedding anniversary date or a birthday. The event, coupled with identification of faces associated with that event, coupled with automatic tagging by the system, can spawn a recurring montage movie compilation. The identification of the event, along with the identification of people associated with that event, can be performed through the mobile application 14 or web interface 24. Once identified, the montage algorithm selects key assets that are available to use for the montage. A key asset selection is theme driven and is based on multiple signals, including 1) the quality of the asset such as sufficient lighting, 2) user inputs such as favorites and 3) social feedback such as most viewed, most commented, most up-voted, favorites identified by the user, etc. Montage movie compilations have their own theme sets, but once key assets are selected, the montage movie compilation itself follows roughly the same algorithm as temporal movie compilations. Some themes will direct the algorithm to treat all assets as key assets but trim the clips to a predefined, and likely short amount of time.

Figure 5:
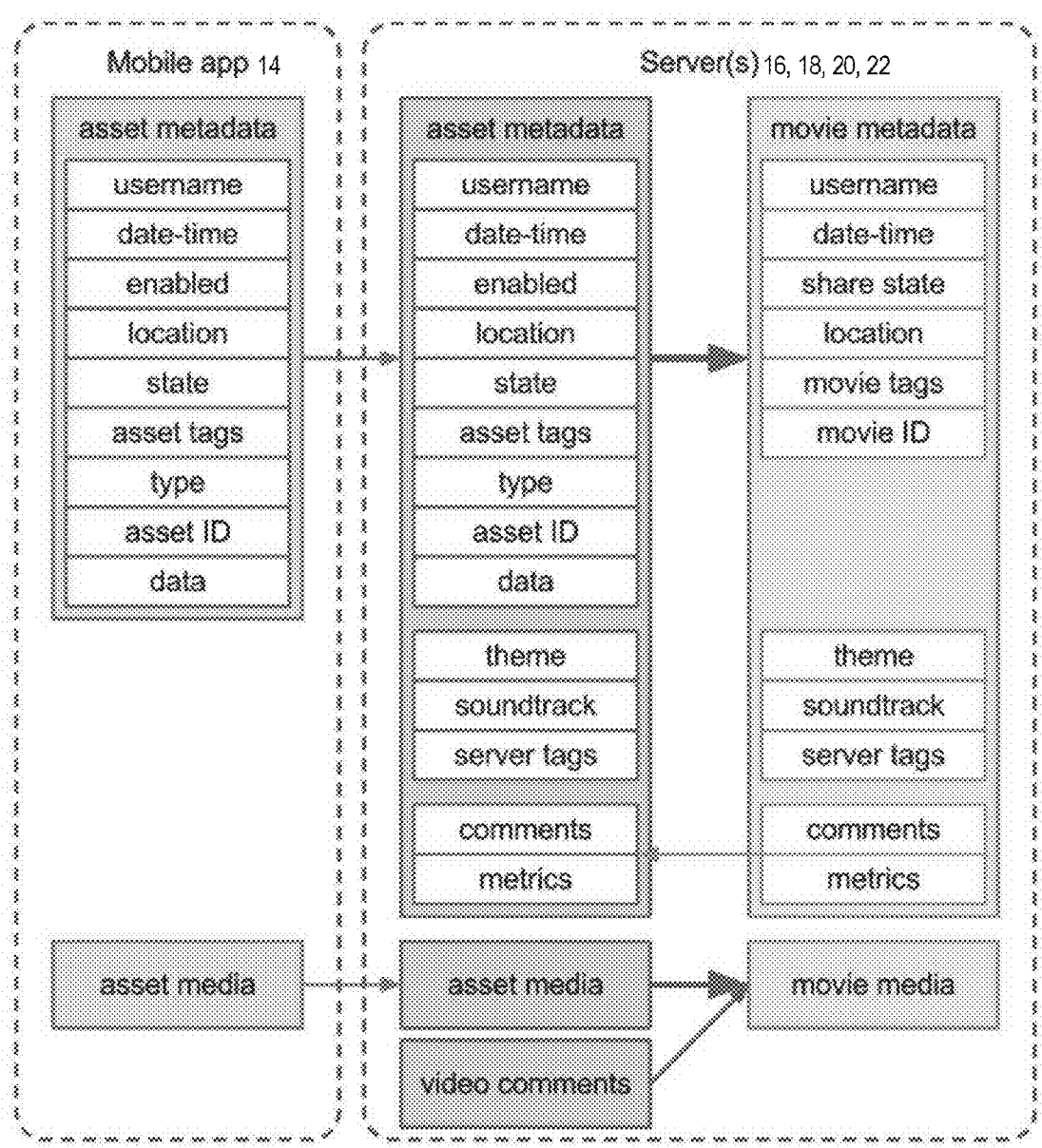
FIG. 5 is a schematic view showing metadata that correspond between a mobile application on the mobile device and various backend servers.

FIG. 5 shows metadata that exists or that is created as part of the mobile application 14 and the servers 16, 18, 20 and 22. A mentioned, the metadata organizer and database 64 of the mobile application 14 and the asset and metadata synchronizer 70 of the backend server 16 synchronize media assets and metadata between them. The asset data migration component 80 moves assets and data between the servers 18, 20 and 22.

Figure 6:
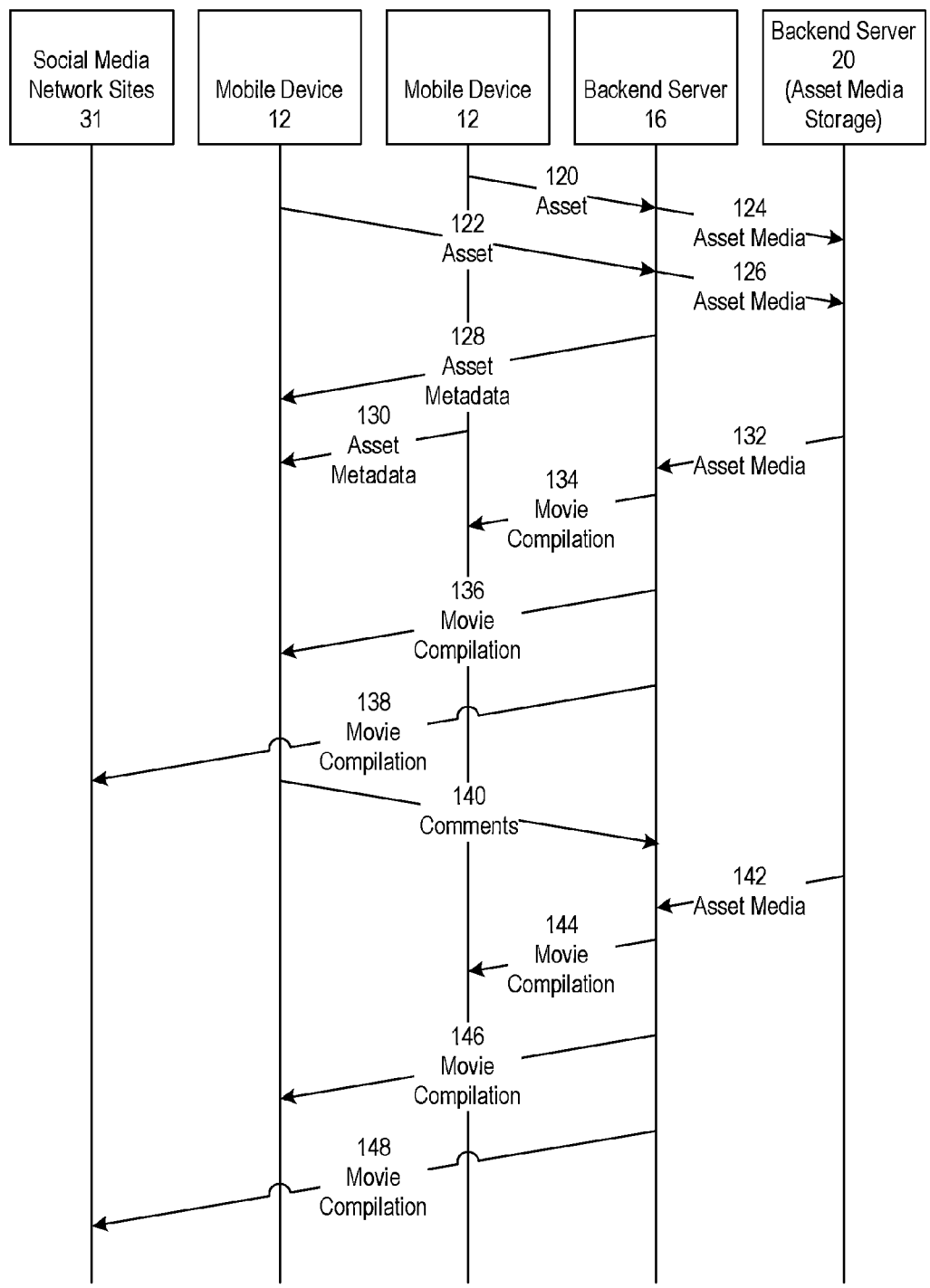
FIG. 6 is an interactive chart that illustrates social sharing aspects of the invention in more detail.

FIG. 6 shows aspects of the invention that relate specifically to sharing of assets for compilation. At 120 and 122, mobile devices 12 upload their assets to their respective accounts at the backend server 16. At 124 and 126, the backend server 16 stores the assets received at 120 and 122 within the backend server 20. At 128 and 130, the backend server 16 transmits the asset metadata to the mobile devices 12 so that the asset metadata is shared between the mobile devices 12.

At 132, the backend server 16 retrieves asset media from the backend server 20. The backend sever 16 then generates movie compilations as hereinbefore described. At 134, 136 and 138, the backend server 16 transmits, serves or shares movie compilations with the mobile devices 12 and the social media network sites 31.

At 140, a user of one of the mobile devices 12 provides comments to the movie compilation received at 136. At 142, the backend server 16 responds to the comments received at 140 to retrieve further asset media from the backend server 20. The backend server 16 then evolves the movie compilations to incorporate the asset media 142 that is selected based on the comments 140. At 144, 146 and 148, the backend server 16 transmits, serves or shares the modified movie compilations with the mobile devices 12 at social media network sites 31.

FIG. 7 illustrates components of the automated movie compilation system 10 that are specific to the upload of establishing shots by pay-per-view advertisers, selection of establishing shots and compensation payment processing for the selection and display of establishing shots from advertisers.

The system 10 includes a number of servers 16, 218, 220 and 224 that interface with the movie compiler 30 and movie server 72 hereinbefore described with reference to FIG. 1, and a number of advertiser web-based or mobile clients 224 (one of which is shown), connected through a network in the form of the Internet 34.

Potential advertisers can create accounts within the system via the client 224 and a client interface 226 on the server 16. Accounts are handled by the advertiser profile manager 228. An advertiser can create an account using a login and account management module 230 that interfaces with the advertiser profile manager 228. Once an account is created, an advertiser can log into their account using the login and account management module 230. After a successful login the advertiser can upload establishing shot clips via an establishing shot manager 232 and establishing shot transmitter 234 on their client 224 to the establishing shot receiver 236 on the server 16. The establishing shot manager 232 on the client 224 manages properties and tags for each establishing shot. Advertisers can upload more than one establishing shot per location, assuming various clips represent different seasons, times of day, weather, and special occasions. The establishing shot receiver 236 saves the establishing shot media to establishing shot media storage in the server 220 stores the associated metadata to the establishing shot metadata database in the server 218. Advertisers can continue to manage properties and tags for their establishing shots via the establishing shot manager 232 on the client 224 and the changes are sent to and saved on the server 220.

Advertisers can also specify how and when their establishing shots are used, since they may be charged for every view. From the establishing shot manager 232 on the client 224, an advertiser can target specific user demographics or other user properties such as the sharing behavior of target users (e.g., sharing with close friends and family only versus broadcasting publicly). A chargeback and payment processor 240 of the server 16 charges different pricing based on the sharing behavior of the users. With attributes applied to the establishing shots, the advertiser can also choose to "sponsor" an upgrade to certain movies in which their establishing shots appear. Upgrades allow premium services to be applied to sub-premium user accounts, such as upgraded movie video quality or upgraded music licenses. The advertiser may also select to block their content's use for users that tend to have objectionable content (e.g., users with videos that are often flagged as inappropriate or content that has an adult rating).

As hereinbefore described, the movie compilation 30 in FIG. 1 is responsible for creating movie narratives. A movie narrative is composed of a number of scenes, where each scene is composed of a number of clips/shots. When a significant time or location transition occurs in the narrative, a new scene is created. The new scene is started with an establishing shot to provide context and setting to the subsequent clips of that scene. An establishing shot, sometimes referred to as an establishing shot clip, includes:

1. The video media itself, stored in the system's media storage repository.

2. Relevant metadata to describe the clip's setting. Location, date and time, and tags can describe a special occasion or a particular "mood" setting. Establishing shot "mood" tags provide non-temporal/location information for the clip. They can, for instance, describe the particular genre of music that should accompany the clip.

Selection of an establishing shot for a scene is performed by the establishing shot selector 92 using an algorithm as a refinement of locale and setting. The server 220 may contain multiple potential establishing shots, represented in the establishing shot metadata of the server 218, for the same location. As discussed with respect to FIG. 4, the establishing shots range from very generic landscape/cityscape clips to specific advertiser's establishing shot clips of business and destination locations.

Through their establishing shot manager 232, the advertiser can select to override the algorithm represented in FIG. 4, for example to set or select a specific set of establishing shots during certain occasion. The advertiser can thereby force the display of special shots without requiring every establishing shot permutation to be in the database.

The movie compiler 30 also provides user statistics and parameters of how the establishing shot will be used, which are stored in a movie compilation and serving metadata database in the server 222. The advertiser's properties for their clips are stored in the database in the server 222 to act as a filter to decide whether their establishing shots will be used for a particular movie. As shown in FIG. 8, if the advertiser had set preferences in the database in the server 222 of user demographics and behavior, the system may decide not to provide the advertiser's establishing shot for a particular movie or user.

Once the movie compiler 30 loads an establishing shot from this system, it will splice (combine) the establishing shot within the movie. There may be multiple establishing shots used in any given movie. Once the movie is complete, it is served by the movie server 72, which provides viewership statistics and other metrics back to this system via the movie serving metrics interface 242. Metrics are stored in the movie compilation and serving metadata database in the server 222. These metrics can be loaded and viewed by advertisers using a metrics client 244 of the client 224.

The server 16 includes the chargeback and payment processor 240 that uses movie serving metrics to calculate the advertiser's cost of using the system and how much their account will be charged. The advertiser can view their bill and perform payment operations via a chargeback and payment client 246 of the client 224.

Because the system stores movie compilation system user information, demographics, and viewership in the movie compilation and serving metadata database of the server 222, potential advertisers can use the system to make target audience queries. Advertisers can then make insightful decisions about spending. For instance, an owner of a family-oriented attraction can see how many users are visiting their attraction, how much content they capture while visiting, and how the resulting movie is shared and watched by family and friends. Adding an advertiser-provided establishing shot can help promote brand awareness and let viewers see any specials that are being featured.

Noncommercial content creators can also create accounts in this system, similar to those of advertisers, through a content creator web based or mobile client 250. Noncommercial content creators can upload establishing shot clips to the system repository, including multiple clips per location as described earlier. These establishing shots for noncommercial locations can be used by a movie compilation system in a similar manner. Using the establishing shot manager in the mobile client 250, creators can attribute or tag their establishing shots with their credits and copyright information. In this respect, content creators use the system in the same manner as advertisers and can be viewed as pay-per-view advertisers themselves. Advertisers (pay-per-view advertisers and content creators) have in common that they have to establish an account, upload establishing shots and metadata for their establishing shots and have the establishing shots be selected based on a match between the based on a match between the metadata of the media asset and the metadata of the establishing shot.

The process for integrating noncommercial establishing shots into user movies is similar to that of advertisers. If, however, the movie compiler 30 flags certain establishing shots as having copyright issues, the corresponding content creators will be notified and those establishing shots may be suspended or purged from the system. As with advertisers, content creators can monitor metrics for viewership information on their clips.

The content creator's banner or text advertisement may be displayed alongside the movie as form of compensation for using their content. In a similar manner, using viewership metrics of movies that feature their content, the system's chargeback and payment processor 240 can calculate compensation to the content creator though a profit sharing mechanism associated with the compiled movie.

Pay-per-view advertisers and content creators can also configure a banner/text advertisement via their client that is stored in the content creator profile interface and manager.

The system 10 thus includes an establishing shot metadata database for establishing shots, metadata, and user profile data, a repository for media storage, and a client interface for advertisers and content creators to access the database and upload their establishing shot clips.

The system 10 provides a backend interface to a movie compilation system that uses the establishing shots described herein. The system 10 provides for integrated advertising for videos/movies, allowing for advertisers to upload establishing shot advertisements for their businesses to a repository, and automatically selects shots based on an algorithm. The advertisers can choose the demographics and sharing behavior for the users' videos they integrate into. The advertisers can determine how many and which movies their advertisements appeared in along with valuable viewership statistics. The advertisers can be charged with an integrated chargeback system. The system also provides a mechanism for crowd-sourced content. Noncommercial content creators can upload establishing shots for noncommercial locations, provided they own the rights to the establishing shots. The crowd-sourced content can be inserted into compiled movies using a similar algorithm as that for advertisers. These noncommercial content creators can be compensated when their establishing shots are used in a compiled movie.

Figure 9:
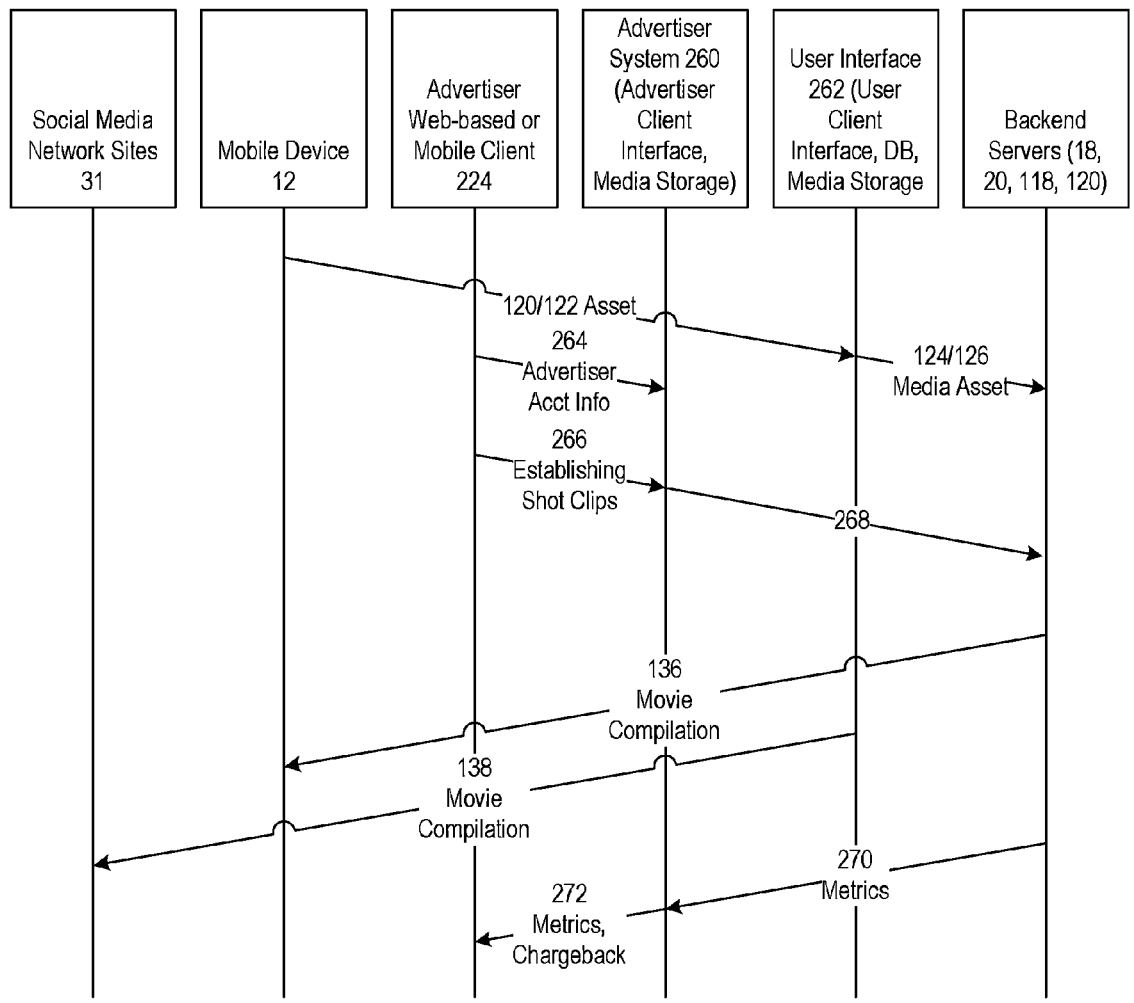
FIG. 9 is an interactive diagram illustrating how establishing shot clips from advertisers are integrated into movie compilations.

FIG. 9 illustrates the integration of advertiser establishment clips with media assets from one or more users. An advertiser system 260 is shown which includes mainly the components within the backend server 16 of FIG. 8. A user interface 262 includes mainly components shown in FIG. 1 within the backend server 16. The advertiser system 260 and user interface 262 are thus both integrated within the backend server 16 shown FIGS. 1 and 8.

At 120 and 122, assets are received from one or more mobile devices 12 by the user interface 262. The reception of the assets has been described with reference to FIG. 6. At 124 and 126, the media assets are stored within the backend server 20 as described with reference to FIG. 6.

At 264, the advertiser system 260 receives advertiser account information from the client 224. The advertiser account information may initially include information such as a user name and a password to establish an account and later include login information to gain access to the account. At 266, the advertiser system 260 receives establishing shot clips from the client 224. The establishing shot clips can only be received after the client 224 has logged in at the advertiser system 260. At 268, the advertiser system 260 stores the establishing shot clips with the backend server 120 and stores the related metadata for the establishing shot clips within the database in the backend server 118.

The advertiser system 260 then combines the establishing shot clips 266 and the asset media to create a movie compilation. At 136 and 138, movie compilations are served to the mobile device 12 and shared with social media networks sites 31 as described with reference to FIG. 6.

The advertiser system 260 maintains metrics of viewership, in particular viewership of advertising media clips when the movie compilations are served at 136 and 138. At 270, the advertiser system 260 retrieves the metrics from the backend server 118. At 272, the advertiser system 260 provides the metrics to the client 224. The advertiser system 260 also charges an account corresponding to the particular client 224 within the backend server 118. The advertiser system 260 further provides information regarding chargeback to the client 224.

Figure 10:
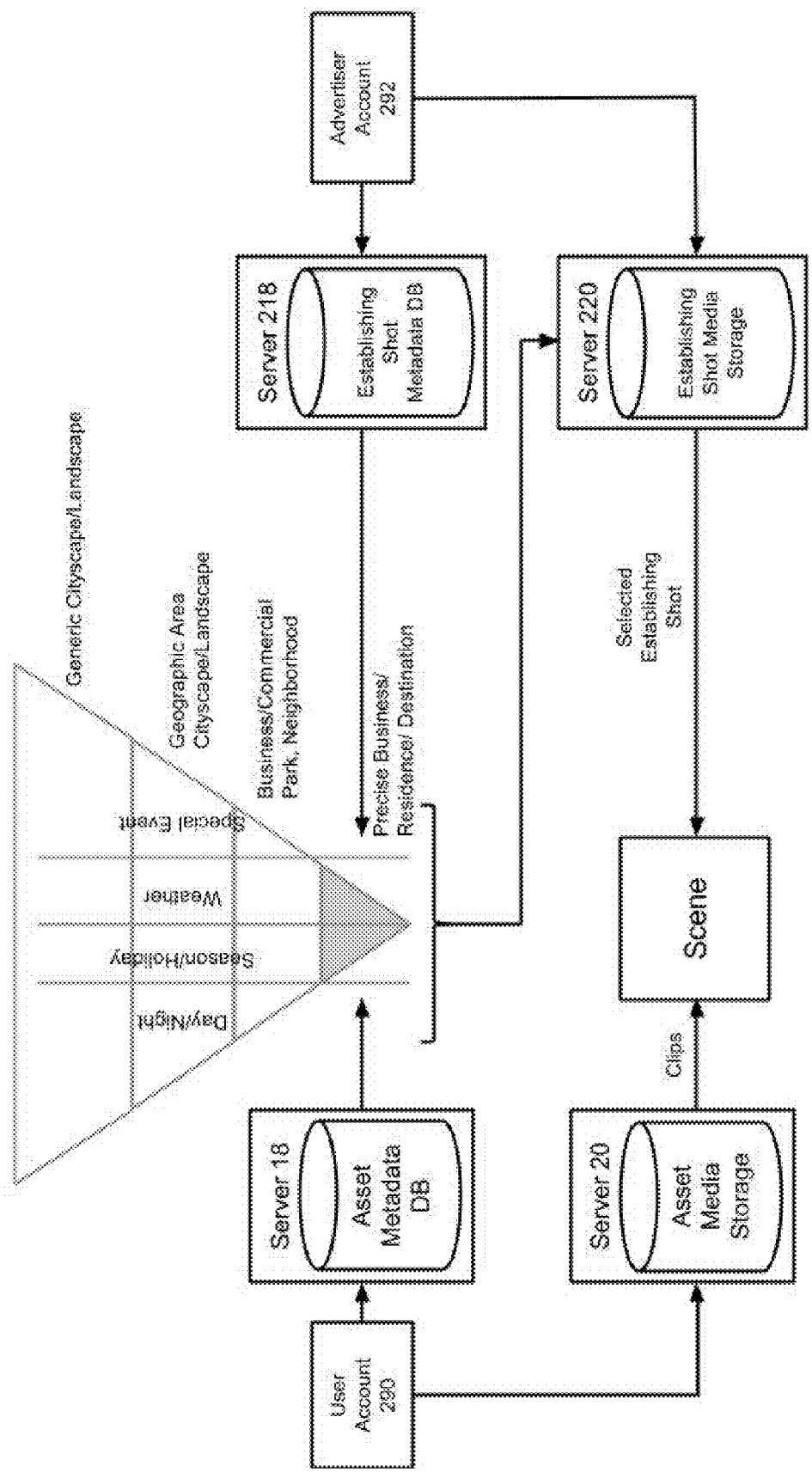
FIG. 10 is a schematic diagram that shows how the metadata associated with media assets in the user account is matched with metadata associated with establishing shots in an advertiser account.

FIG. 10 illustrates how metadata associated with media assets in a user account 290 is matched to metadata in the server 218 associated with an advertiser account 292. The same triangle shown in FIG. 4 is used to match the metadata. The metadata is only matched if there is a relatively high precision of accuracy, represented by the lower tip of the triangle. Time may be a factor that can be considered before deciding to use an advertiser clip. For example, if the user was at an advertiser location during lunch or dinner time and has spent enough time at the location to have had a meal, then it would trigger the use of an establishing shot. Once the metadata is matched, then the media asset is retrieved from the server 20 and the establishing shot media is retrieved from the server 220 and combined into a scene.

Figure 11:
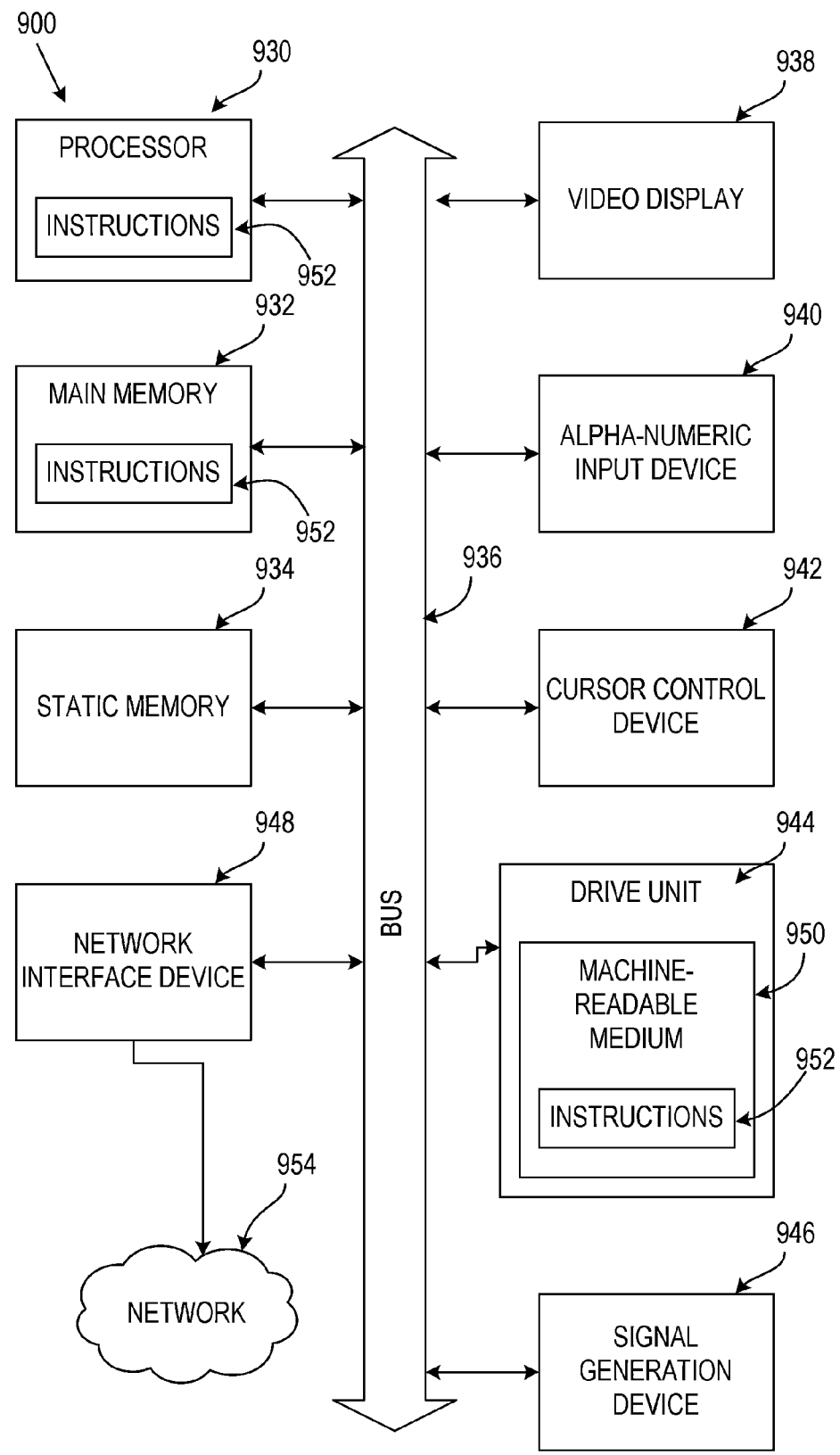
FIG. 11 is a block diagram of a machine in the form of a computer system forming part of the automated movie compilation system.

FIG. 11 shows a diagrammatic representation of a machine in the exemplary form of a computer system 900 within which a set of instructions, for causing the machine to perform any one or more of the methodologies discussed herein, may be executed. In alternative embodiments, the machine operates as a standalone device or may be connected (e.g., networked) to other machines. In a network deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processor 930 (e.g., a central processing unit (CPU), a graphics processing unit (GPU), or both), a main memory 932 (e.g., read-only memory (ROM), flash memory, dynamic random access memory (DRAM) such as synchronous DRAM (SDRAM) or Rambus DRAM (RDRAM), etc.), and a static memory 934 (e.g., flash memory, static random access memory (SRAM, etc.), which communicate with each other via a bus 936.

The computer system 900 may further include a video display 938 (e.g., a liquid crystal displays (LCD) or a cathode ray tube (CRT)). The computer system 900 also includes an alpha-numeric input device 940 (e.g., a keyboard), a cursor control device 942 (e.g., a mouse), a disk drive unit 944, a signal generation device 946 (e.g., a speaker), and a network interface device 948.

The disk drive unit 944 includes a machine-readable medium 950 on which is stored one or more sets of instructions 952 (e.g., software) embodying any one or more of the methodologies or functions described herein. The software may also reside, completely or at least partially, within the main memory 932 and/or within the processor 930 during execution thereof by the computer system 900, the memory 932 and the processor 930 also constituting machine readable media. The software may further be transmitted or received over a network 954 via the network interface device 948.

Figure 12:
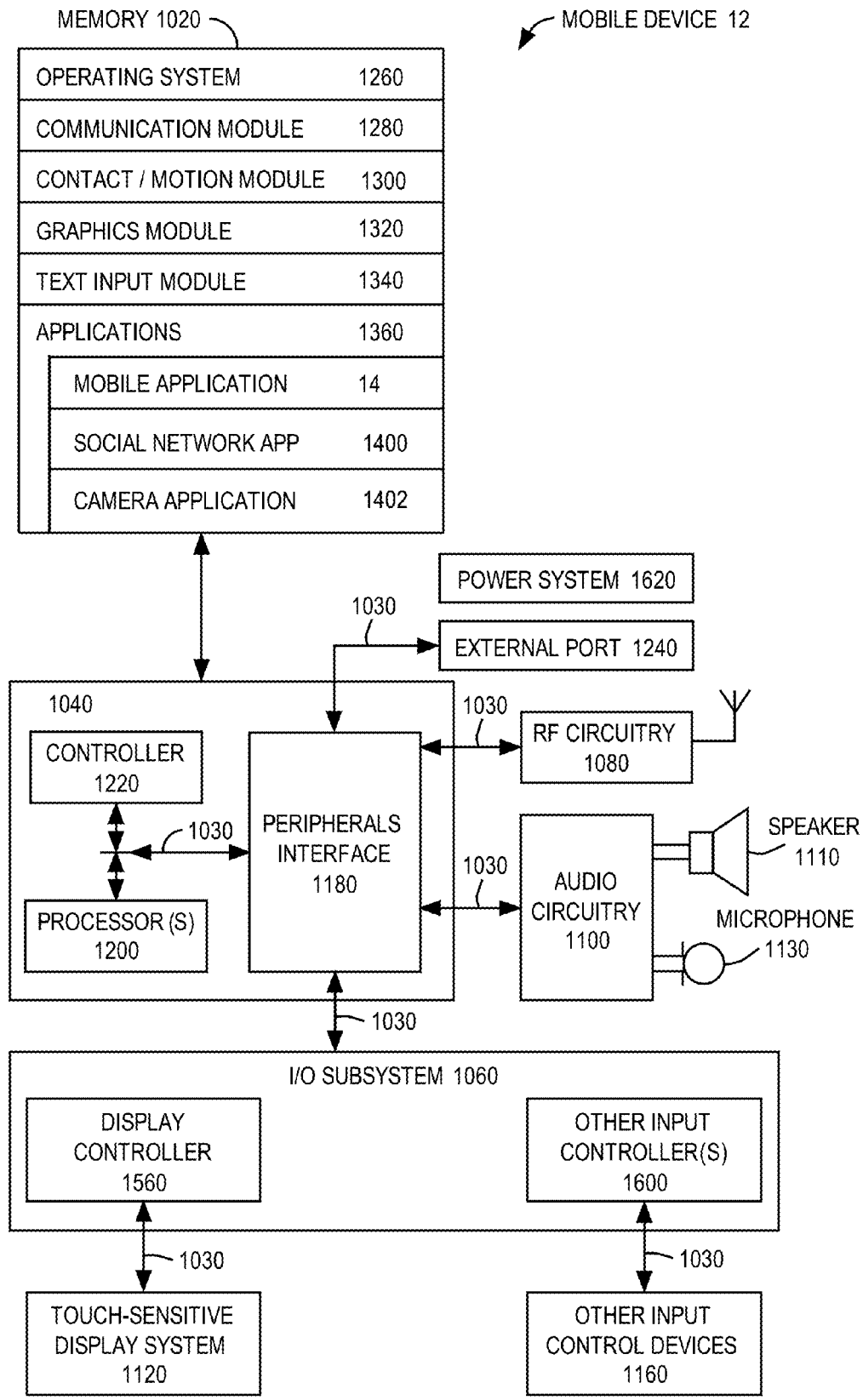
FIG. 12 is a block diagram of the mobile device illustrating SmartPhone features thereof.

FIG. 12 is a block diagram illustrating the mobile device 12, illustrating a touch-sensitive display 1120 or a "touch screen" for convenience. The mobile device 12 includes a memory 1020 (which may include one or more computer readable storage mediums), a memory controller 1220, one or more processing units (CPU's) 1200, a peripherals interface 1180, RF circuitry 1080, audio circuitry 1100, a speaker 1110, a microphone 1130, an input/output (I/O) subsystem 1060, other input or control devices 1160 and an external port 1240. These components communicate over one or more communication buses or signal lines 1030.

The various components shown in FIG. 12 may be implemented in hardware, software or a combination of hardware and software, including one or more signal processing and/or application specific integrated circuits.

The memory 1020 may include high-speed random access memory and may also include non-volatile memory, such as one or more magnetic disk storage devices, flash memory devices, or other non-volatile solid-state memory devices. Access to the memory 1020 by other components of the mobile device 12, such as the CPU 1200 and the peripherals interface 1180, is controlled by the memory controller 1220.

The peripherals interface 1180 connects the input and output peripherals of the device to the CPU 1200 and memory 1020. The one or more processors 1200 run or execute various software programs and/or sets of instructions stored in the memory 1020 to perform various functions for the mobile device 12 and to process data.

The RF (radio frequency) circuitry 1080 receives and sends RF signals, also called electromagnetic signals. The RF circuitry 1080 converts electrical signals to/from electromagnetic signals and communicates with communications networks and other communications devices via the electromagnetic signals. The RF circuitry 1080 includes well-known circuitry for performing these functions, including an antenna system, an RF transceiver, one or more amplifiers, a tuner, one or more oscillators, a digital signal processor, a CODEC chipset, a subscriber identity module (SIM) card, memory, and so forth. The RF circuitry 1080 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies that are known in the art.

The audio circuitry 1100, the speaker 1110, and the microphone 1130 provide an audio interface between a user and the mobile device 12. The audio circuitry 1100 receives audio data from the peripherals interface 1180, converts the audio data to an electrical signal, and transmits the electrical signal to the speaker 1110. The speaker 1110 converts the electrical signal to human-audible sound waves. The audio circuitry 1100 also receives electrical signals converted by the microphone 1130 from sound waves. The audio circuitry 1100 converts the electrical signal to audio data and transmits the audio data to the peripherals interface 1180 for processing. The audio circuitry 1100 also includes a headset jack serving as an interface between the audio circuitry 1100 and removable audio input/output peripherals, such as output-only headphones or a headset with both output (e.g., a headphone for one or both ears) and input (e.g., a microphone).

The I/O subsystem 1060 connects input/output peripherals on the mobile device 12, such as the touch screen 1120 and other input/control devices 1160, to the peripherals interface 1180. The I/O subsystem 1060 includes a display controller 1560 and one or more input controllers 1600 for other input or control devices. The one or more input controllers 1600 receive/send electrical signals from/to other input or control devices 1160. The other input/control devices 1160 may include physical buttons (e.g., push buttons, rocker buttons, etc.), dials, slider switches, joysticks, click wheels, and so forth all serving as forming part of an interface. The input controllers 1600 may be connected to any of the following: a keyboard, infrared port, USB port, and a pointer device such as a mouse. The one or more buttons may include an up/down button for volume control of the speaker 1110 and/or the microphone 1130. The one or more buttons may include a push button. A quick press of the push button may disengage a lock of the touch screen 1120 or begin a process that uses gestures on the touch screen to unlock the device. A longer press of the push button may turn power to the mobile device 12 on or off. The touch screen 1120 is used to implement virtual or soft buttons and one or more soft keyboards.

The touch-sensitive touch screen 1120 provides an input interface and an output interface between the device and a user. The display controller 1560 receives and/or sends electrical signals from/to the touch screen 1120. The touch screen 1120 displays visual output to the user. The visual output may include graphics, text, icons, video, and any combination thereof (collectively termed "graphics"). In some embodiments, some or all of the visual output may correspond to user-interface objects, further details of which are described below.

A touch screen 1120 has a touch-sensitive surface, sensor or set of sensors that accepts input from the user based on haptic and/or tactile contact. The touch screen 1120 and the display controller 1560 (along with any associated modules and/or sets of instructions in memory 1020) detect contact (and any movement or breaking of the contact) on the touch screen 1120 and converts the detected contact into interaction with user-interface objects (e.g., one or more soft keys, icons, web pages or images) that are displayed on the touch screen. In an exemplary embodiment, a point of contact between a touch screen 1120 and the user corresponds to a finger of the user.

The touch screen 1120 may use LCD (liquid crystal display) technology, or LPD (light emitting polymer display) technology, although other display technologies may be used in other embodiments. The touch screen 1120 and the display controller 1560 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 1120.

The user may make contact with the touch screen 1120 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

The mobile device 12 also includes a power system 1620 for powering the various components. The power system 1620 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The software components stored in memory 1020 include an operating system 1260, a communication module (or set of instructions) 1280, a contact/motion module (or set of instructions) 1300, a graphics module (or set of instructions) 1320, a text input module (or set of instructions) 1340, and applications (or set of instructions) 1360.

The operating system 1260 (e.g., iOS, Android or Windows) includes various software components and/or drivers for controlling and managing general system tasks (e.g., memory management, storage device control, power management, etc.) and facilitates communication between various hardware and software components.

The communication module 1280 facilitates communication with other devices over one or more external ports 1240 and also includes various software components for handling data received by the RF circuitry 1080 and/or the external port 1240. The external port 1240 (e.g., Universal Serial Bus (USB), LIGHTNING, etc.) is adapted for coupling directly to other devices or indirectly over a network (e.g., the Internet, wireless LAN, etc.).

The contact/motion module 1300 may detect contact with the touch screen 1120 (in conjunction with the display controller 1560) and other touch sensitive devices (e.g., a touchpad or physical click wheel). The contact/motion module 1300 includes various software components for performing various operations related to detection of contact, such as determining if contact has occurred, determining if there is movement of the contact and tracking the movement across the touch screen 1120, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). The contact/motion module 1300 and the display controller 1560 also detects contact on a touchpad.

The graphics module 1320 includes various known software components for rendering and displaying graphics on the touch screen 1120, including components for changing the intensity of graphics that are displayed. As used herein, the term "graphics" includes any object that can be displayed to a user, including text, web pages, icons (such as user-interface objects including soft keys), digital images, videos, animations and the like.

The text input module 1340, which may be a component of graphics module 1320, provides soft keyboards for entering text in various applications (e.g., contacts, email, IM, blogging, browser, and any other application that needs text input). The applications 1360 may include the mobile application 14 and a social network application 1400 and a camera application 1402.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A method of automatically compiling a movie, comprising:
   executing a mobile application on a mobile device, the mobile application sampling media assets and metadata, and transmits the media assets and metadata, wherein the metadata is at least location metadata and is automatically sampled without user input;
   receiving, with a processor, the media assets and the location metadata from the mobile device;
   storing, with the processor, the media assets received from the mobile device;
   storing, with the processor, the location metadata received from the mobile device for each one of the media assets received from the mobile device;
   establishing, with the processor, a plurality of advertiser accounts;
   storing, with the processor, an establishing shot in association with each advertiser account;
   storing, with the processor, at least location metadata for each establishing shot;
   selecting, with the processor, one of the establishing shots that are associated with the advertiser accounts based on a match between the location metadata received from the mobile device of at least one of the media assets received from the mobile device and the location metadata of the establishing shot; and
   serving, with the processor, a movie compilation for viewing, wherein the movie compilation includes the establishing shot combined with the media asset having the location metadata matching the location metadata of the establishing shot, wherein the movie compilation is served for viewing on the device by the mobile application.

2. The method of claim 1, wherein the metadata received from the mobile device of the media assets received from the mobile device include time.

3. The method of claim 1, wherein the location metadata for the establishing shots range from generic to specific for a location and the processor selects an establishing shot that is more specific for the location over an establishing shot that is more generic for the location.

4. The method of claim 1, further comprising:
storing, with the processor, movie viewing metrics for viewing of the establishing shot; and
charging, with the processor, the advertiser account corresponding to the establishing shot based on the movie viewing metrics.

5. The method of claim 1, further comprising:
distributing, with the processor, the mobile application and the mobile application samples the media assets using at least a camera of the mobile device.

6. The method of claim 5, wherein the mobile application samples the metadata for the media asset and the metadata for the media asset includes time and location.

7. The method of claim 5, wherein the mobile application copies the media assets from a video or photo album on the mobile device.

8. The method of claim 5, wherein the movie compilation includes clips from users other than the user of the mobile device based on relationships between the user of the device with the other users.

9. The method of claim 8, further comprising:
storing, with the processor, a social graph, the relationships being social relationships represented in the social graph.

10. The method of claim 5, wherein the mobile application allows for the user to manually add metadata using a tagging system.

11. The method of claim 5, further comprising:
automatically tagging, with the processor, the media assets with the processor.

12. The method of claim 1, wherein the movie compilation includes a plurality of scenes, each scene including a plurality of clips that are grouped into a scene based on a separate location, further comprising:
selecting, with the processor, an establishing shot for each scene.

13. The method of claim 1, wherein the advertiser account has multiple establishing shots.

14. An automated movie compilation system comprising:
(a) a mobile device that includes:
a processor;
a computer readable medium connected to the processor;
a data store connected to the processor; and
a set of instructions on the computer readable medium that are executable by the processor, including:
a mobile application executable on a mobile device, the mobile application sampling media assets and metadata, and transmits the media assets and metadata, wherein the metadata is at least location metadata and is automatically sampled without user input; and
a compiled movie playback system; and
(b) a backend server that includes:
a processor;
a computer readable medium connected to the processor;
a data store connected to the processor; and
a set of instructions on the computer readable medium that are executable by the processor, including:
an asset and metadata synchronizer receiving the media assets and the location metadata from the mobile device and storing media assets received from the mobile device and the location metadata received from the mobile device for each one of the media assets received from the mobile device;
an advertiser profile manager establishing a plurality of advertiser accounts;
an establishing shot receiver storing an establishing shot in association with each advertiser account;
a movie serving metrics interface storing at least location metadata for each establishing shot;
an establishing shot selector selecting one of the establishing shots that are associated with the advertiser accounts based on a match between the location metadata received from the mobile device of at least one of the media assets received from the mobile device and the location metadata of the establishing shot; and
a movie server serving a movie compilation for viewing, wherein the movie compilation includes the establishing shot combined with the media asset having the location metadata matching the location metadata of the establishing shot, wherein the movie compilation is served for viewing on the device by the mobile application by the compiled movie playback system.

15. The system of claim 14, further comprising:
a chargeback and payment processor, charging the advertiser account corresponding to the establishing shot based on the movie viewing metrics.

* * * * *